(12) United States Patent
Saitoh et al.

(10) Patent No.: US 7,614,681 B2
(45) Date of Patent: Nov. 10, 2009

(54) DOOR CONSTRUCTION FOR VEHICLE, AND MANUFACTURING METHOD FOR VEHICULAR DOOR

(75) Inventors: Hajime Saitoh, Shioya-gun (JP); Tomofumi Ichinose, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 226 days.

(21) Appl. No.: 11/612,127

(22) Filed: Dec. 18, 2006

(65) Prior Publication Data

US 2007/0145767 A1 Jun. 28, 2007

(30) Foreign Application Priority Data

Dec. 28, 2005 (JP) ............................. 2005-378023

(51) Int. Cl.
*B60J 5/10* (2006.01)

(52) U.S. Cl. .................... 296/146.5; 296/146.8; 296/56
(58) Field of Classification Search ............. 296/146.5, 296/146.6, 146.8, 56, 29, 30, 901.01; 49/502
See application file for complete search history.

(56) References Cited

U.S. PATENT DOCUMENTS

| 6,053,562 | A | 4/2000 | Bednarski | |
| 6,929,308 | B2 * | 8/2005 | Komatsu et al. | 296/146.5 |
| 7,380,866 | B2 * | 6/2008 | Saitoh et al. | 296/146.5 |
| 7,399,022 | B2 * | 7/2008 | Kalmbach et al. | 296/146.8 |
| 2003/0067187 | A1 * | 4/2003 | Curtiss et al. | 296/146.5 |
| 2003/0107235 | A1 * | 6/2003 | Komatsu et al. | 296/146.5 |
| 2005/0168009 | A1 * | 8/2005 | Dry et al. | 296/146.5 |
| 2006/0022486 | A1 * | 2/2006 | Kalmbach et al. | 296/146.8 |
| 2006/0181107 | A1 | 8/2006 | Nishikawa | |

FOREIGN PATENT DOCUMENTS

| EP | 1 291 212 | 3/2003 |
| JP | 61-71511 | 5/1986 |
| JP | 6-305329 | 11/1994 |
| JP | 07-080559 | 3/1995 |
| JP | 2005-349855 | 12/2005 |

* cited by examiner

*Primary Examiner*—Glenn Dayoan
*Assistant Examiner*—Gregory Blankenship
(74) *Attorney, Agent, or Firm*—Rankin, Hill & Clark LLP

(57) ABSTRACT

The present invention is a door construction for a vehicle provided with a door main body including an inner panel on a cabin interior side and an outer panel on a cabin exterior side. The inner panel and the outer panel are formed in a concaved-shape when viewed from the cabin interior side; a hemming flange is provided on a periphery of the inner panel, which is to be turned onto the outer panel; and the inner panel and the outer panel are joined with each other by joining the hemming flange onto the cabin exterior side of the outer panel by a hemming.

8 Claims, 5 Drawing Sheets

DOOR CONSTRUCTION FOR VEHICLE, AND MANUFACTURING METHOD FOR VEHICULAR DOOR

BACKGROUND OF THE INVENTION

Priority is claimed on Japanese Patent Application No. 2005-378023, filed Dec. 28, 2005, the contents of which are incorporated herein by reference.

1. Field of the Invention

The present invention relates to a door construction for a tailgate (a back door) or the like of a vehicle, and a manufacturing method for a vehicular door.

2. Description of the Related Art

An ordinary door for a vehicle is constructed by: unitarily joining an inner panel on a cabin interior side and an outer panel on a cabin exterior side; and attaching an interior decoration cover facing the cabin interior side, thereto. The outer panel and the inner panel are joined with each other by performing a hemming onto peripheries of these panels (for example, refer to Japanese Unexamined Patent Application, First Publication No. H07-80559).

In more detail, as shown in FIG. 7, while in a state in which hemming flanges 53 to be bent onto an inner panel 52 side are formed on a periphery of an outer panel 51 and the inner panel 52 overlaps the inside of the outer panel 51, the hemming flanges 53 are bent so as to overlap the cabin interior side of the inner panel 52. Moreover, FIG. 7 shows a flap-type tailgate (a back door) of a vehicle. The reference symbol 54 in FIG. 7 denotes a hinge which attaches the tailgate to a vehicle such that the tailgate is rotatable in the vertical direction.

On the other hand, as shown in FIG. 8, there is a door for a vehicle which is formed in a curved-shape such that the cabin interior side thereof forms a concaved-shape. In the case in which the above-mentioned construction is applied to this type of door, the hemming flanges 53, which are preliminarily bent before overlapping the inner panel 52 onto the outer panel 51, form an undercut-shape with respect to a main body of the outer panel 51, as shown in FIG. 9. That is, the preliminary bending angles of the hemming flanges 53 are a substantially right angles (90° to 100°) so as to prevent dislocation while setting the outer panel 51 onto the inner panel 52, and the curved direction of the outer panel 51 and the bending direction of the hemming flange 53 are the same; therefore, the hemming flanges 53 form the undercut-shape with respect to a main body of the outer panel 51.

In addition, in the case in which the above-mentioned conventional construction is employed, since the hemming flanges 53 form the undercut-shape at the preliminary bend with respect to the main body of the outer panel 51, as shown in FIG. 9, a large difference occurs between the pressing direction of an entire of the outer panel 51 and the bending direction of the hemming flanges 53. Therefore, a metal mold 55 for bending the hemming flanges 53 has to be driven independently with respect to the above-mentioned pressing direction using cams or the like; and furthermore, the a metal mold 56 for receiving the bent outer panel 51 has to be removed from the undercut section by making slide it in the direction substantially perpendicular to the pressing direction after forming the outer panel 51. Accordingly, a concern is that press-working of the outer panel 51 is complex, and thereby introduces an increase in facility cost.

Furthermore, in the case in which the above-mentioned conventional door construction is employed, since the hemming flanges 53 at the preliminary bend form the undercut-shape with respect to the main body of the outer panel 51, an opening width between the hemming flanges 53 of the outer panel 51 becomes smaller than the total width of the inner panel 52, as shown by "(A)" in FIG. 8. Therefore, in order to set the inner panel 52 onto the outer panel 51, one end of the inner panel 52 has to be inserted into the inside of the hemming flange 53 while inclining the inner panel 52 as indicated by "(B)" in FIG. 8; and thereafter, another end of the inner panel 52 has to be pushed into the inside of the hemming flange 53 while rotating the outer panel 51 as indicated by a white arrow in FIG. 8. Therefore, operations for setting the inner panel 52 to the outer panel 52 before the hemming, becomes complex. Thus, it has been desired to make this setting operation simpler and thereby improve the working performance.

The present invention was made in view of the above circumstances, and has an object of providing a door construction for a vehicle, and a manufacturing method for a vehicular door which enables improving the production performance by making it easier to preliminarily bend a hemming flange before hemming and to perform setting between an inner panel and an outer panel after the preliminary bending.

SUMMARY OF THE INVENTION

The present invention employs the following in order to achieve the above object.

That is, a door construction for a vehicle of the present invention is a door construction for a vehicle provided with a door main body including an inner panel on a cabin interior side and an outer panel on a cabin exterior side, wherein the inner panel and the outer panel are formed in a concaved-shape when viewed from the cabin interior side; a hemming flange is provided on a periphery of the inner panel, which is to be turned onto the outer panel; and the inner panel and the outer panel are joined with each other by joining the hemming flange onto the cabin exterior side of the outer panel by a hemming.

According to the door construction for a vehicle, during the manufacturing thereof, the hemming flange is preliminarily bent toward the side opposite to the concaved curving shape of the inner panel. Then the outer panel is set between the preliminarily bent flanges. The hemming flanges at this time open to the outside with respect to the joining direction of the outer panel. After setting the outer panel onto the inner panel like this, final bending of the hemming flanges is performed. As a result, the inner panel and the outer panel are joined with each other.

Therefore, since the hemming flanges can be preliminarily bent to the outside in the joining direction of the outer panel, undercut portions will not be formed while forming the preliminary bend. As a result, drawing from a mold during the preliminary bending becomes preferable, and setting of the outer panel into the insides of the hemming flanges of the inner panel becomes easier. Accordingly, it is possible to reliably improve the production performance.

In addition, when filler such as a dust-sealer is painted onto an end portion of the hemming flange while attaching the door into the vehicle body via hinges, since the hemming flange is disposed on the cabin exterior side face being a back side of the mounting portions of the door hinges, the door hinges will not be an obstacle for painting the filler. Accordingly, there is an advantage in that operability for painting the filler increases.

A resin-made exterior panel for covering the hemming flange from an outside thereof may be provided on the cabin exterior side of the outer panel.

In this case, the hemming flange cannot be seen from the cabin interior side because the hemming flange is located on the cabin exterior side. Furthermore, the hemming flange cannot be seen from the cabin exterior side because the hemming flange located on the cabin exterior side is covered with the resin-made exterior panel. Accordingly, the appearance quality of the vehicle can be improved reliably.

In addition, when filler such as a dust-sealer is painted onto an end portion of the hemming flange while attaching the door into the vehicle body via hinges, since the hemming flange is disposed on the cabin exterior side face being a back side of the mounting portions of the door hinges, the door hinges will not be an obstacle for painting the filler. Accordingly, there is an advantage in that operability for painting the filler increases.

It may be arranged such that the exterior panel includes a stopping rib which is unitarily formed therein so as to protrude toward the outer panel; and the stopping rib contacts the hemming flange.

In this case, since the stopping rib unitarily formed on the exterior panel to contact with the hemming flange has high strength, the rigidity of the edge of the exterior panel can be increased. Accordingly, it is possible to reliably prevent a deformation of the exterior panel during closing the door, without problems such as an increase in the number of parts.

A covering portion which covers the hemming flange from the cabin exterior side may be provided in a transparent member.

It may be arranged such that: the door main body is a tailgate with the hemming flange covered with a resin-made exterior panel at a substantially middle lower of the tailgate and a transparent member at a substantially middle upper of the tailgate.

A filler may be painted on an end of the hemming flange.

The present invention also employed a manufacturing method for a vehicular door provided with an inner panel on a cabin interior side and an outer panel on a cabin exterior side, the inner panel and the outer panel being formed in a concaved-shape when viewed from the cabin interior side, and peripheries of the inner panel and the outer panel being joined with each other by a hemming, wherein the manufacturing method includes: providing a hemming flange to be turned onto the outer panel on a periphery of the inner panel; bending by press-working the inner panel such that the hemming flange opens toward an exterior side with respect to a joining direction of the outer panel; and turning the hemming flange onto a face on the cabin exterior side of the outer panel and performing the hemming, after setting the outer panel onto the cabin exterior side of the inner panel.

DETAILED DESCRIPTION OF THE INVENTION

One embodiment of the present invention will be explained below with reference to FIGS. 1 to 6. Moreover, in the following explanation, "up" and "down" mean upward and downward in the vertical direction, assuming if there is no other explanation.

Figure 1:
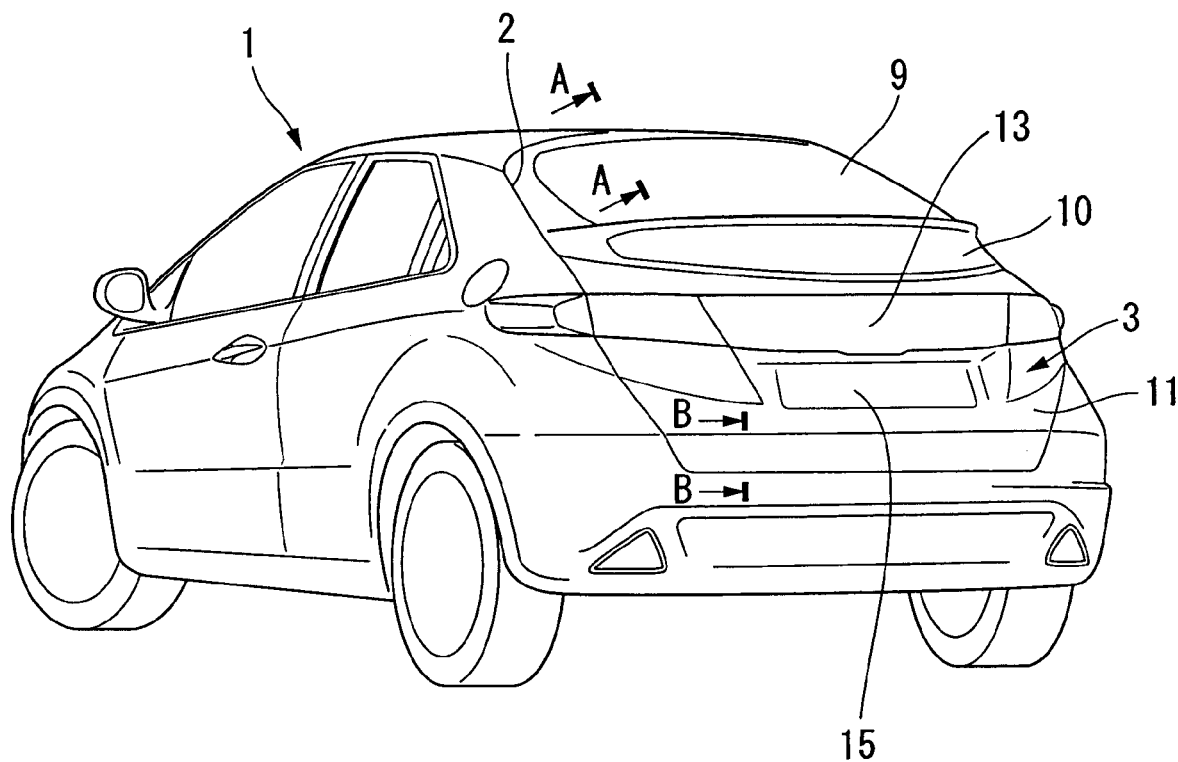
FIG. 1 shows a rear perspective view of a vehicle according to one embodiment of the present invention.

In FIG. 1, a reference symbol 1 denotes a vehicle provided with a door construction of the present invention. A door opening 2 is provided on a rear of a vehicle body of the vehicle 1. A tailgate 3 (a door) is attached to an upper of the door opening 2 via door hinges 20 (refer to FIG. 2) so as to be openable and closable in the vertical direction. In addition, a non-illustrated door-locking mechanism is provided between an inside bottom edge of the door opening 2 and a bottom of the tailgate 3.

Figure 2:
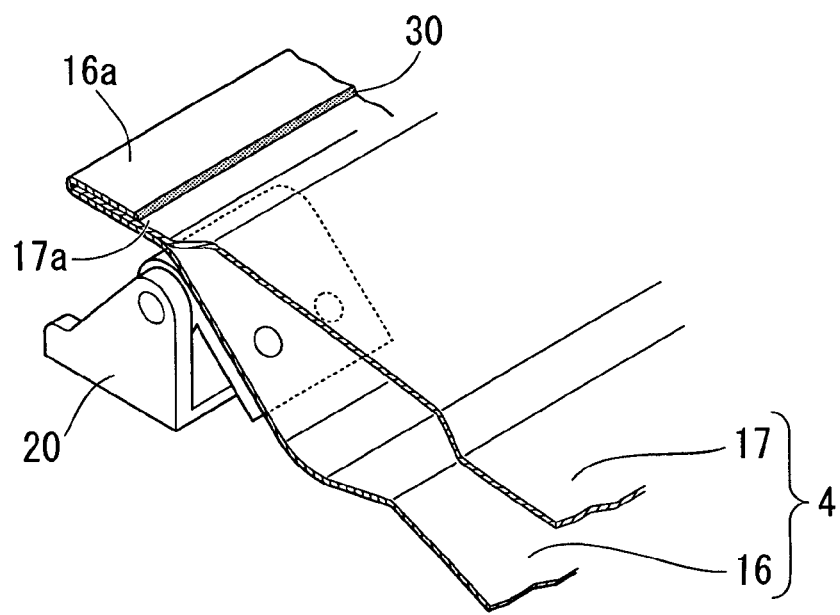
FIG. 2 shows the same embodiment and is a partial perspective cross-sectional view taken along the line A-A in FIG. 1.
Figure 3:
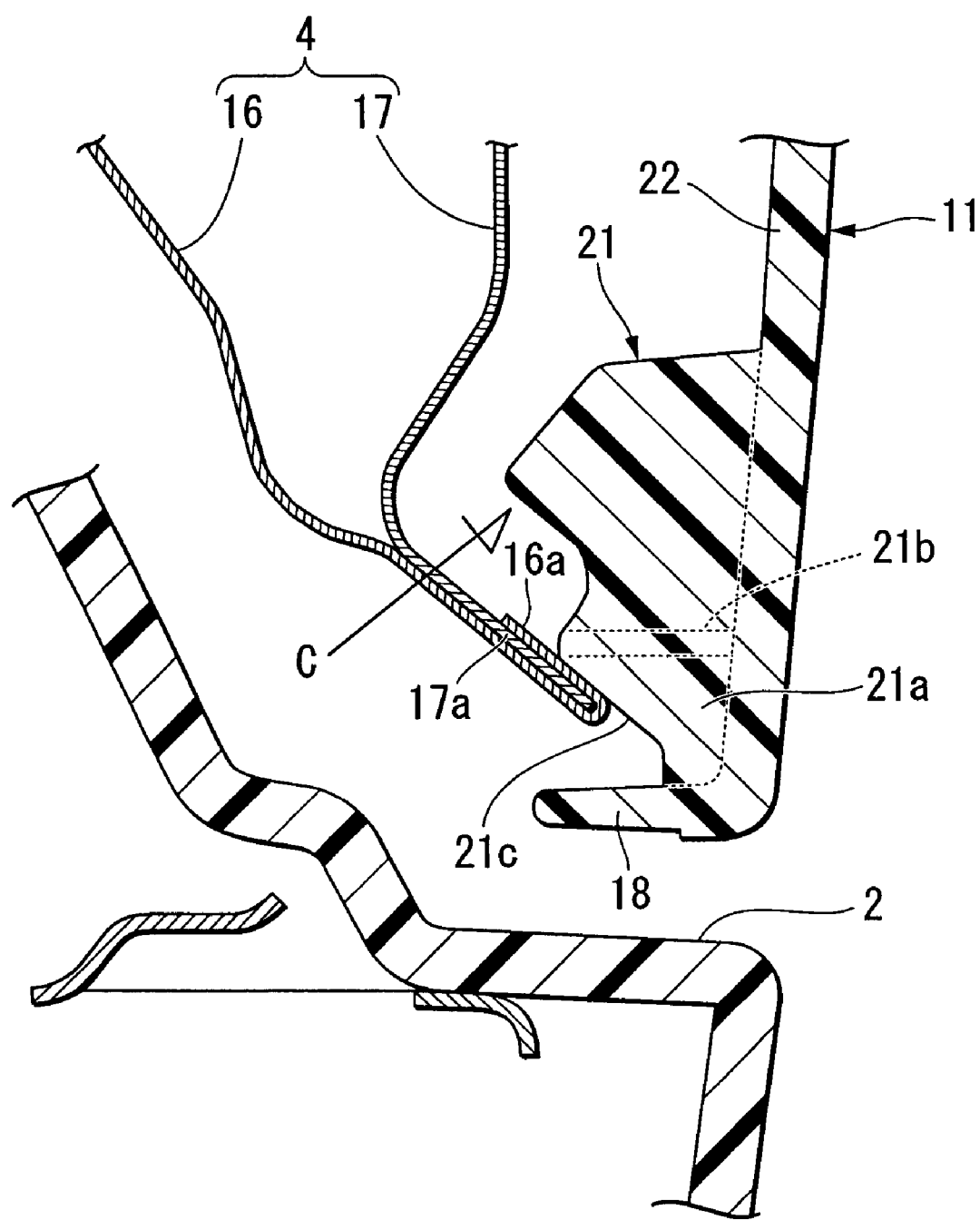
FIG. 3 shows the same embodiment and is an enlarged cross-sectional view taken along the line B-B in FIG. 1.

The tailgate 3 is provided with: a door frame panel 4 (a door main body; Refer to FIGS. 2 and 3) formed from steel plate material; a door glass 9 and an extra window panel 10 attached to the cabin exterior side (an exterior of the rear body) of the door frame panel 4; and a resin-made lower garnish 11 (an exterior panel) attached to the cabin exterior side of the door frame panel 4, below the extra panel 10. Rear lights 13 are mounted in the lower garnish 11 along the vehicle width direction. A base 15 for attaching a number plate is provided below the center rear light 13 located substantially centrally in the car width direction.

As shown in FIGS. 2 and 3, the door frame panel 4 is composed of an inner panel 16 on the cabin interior side and an outer panel 17 on the cabin exterior side. An outer periphery of the inner panel 16 is unitarily joined with an outer periphery of the outer panel 17 by hemming. In more detail, a hemming flange 16a having a larger size than a joining flange 17a formed on a periphery of the outer panel 17, is formed on a periphery of the inner panel 16; and, in the state in which the outer panel 17 is set onto the cabin exterior side of the inner panel 16, the hemming flange 16a of the inner panel 16 is turned onto the cabin exterior side of the joining flange 17a so as to wrap an edge portion of the joining plate 17a. In addition, the inner panel 16 and the outer panel 17 protrude toward the cabin exterior side at most at a location and there around of the tailgate 3, to which the extra window panel 10 is attached. As a result, the inner panel 16 and the outer panel 17 are formed such that each of the cabin interior sides thereof forms a concaved-shape.

As explained in the above, the door frame panel 4 is formed by turning the hemming flange 16a formed on a periphery of the inner panel 16 toward the cabin exterior side, and by performing a hemming process between the inner panel 16 and the outer panel 17. In a substantially middle lower of the tailgate 3, a rear side in the vehicle length direction of the turned hemming flange 16a is covered with the periphery of the lower garnish 11. In a substantially middle upper of the tailgate 3, the rear side in the vehicle length direction of the turned hemming flange 16a is covered with black shading portions of the door glass 9 and the extra window panel 10.

As shown in FIG. 3, the lower end of the lower garnish 11 bends toward the cabin interior side to substantially form a L-shape, and a leading edge of a bending piece 18 is located under the hemming-jointed portion between the inner panel 16 and the outer panel 17 so as to overlap in the vehicle length direction with the hemming-jointed portion. That is, since an underside of the hemming-jointed portion between the inner panel 16 and the outer 17 is covered with the bending piece 18 of the lower garnish 11, the rear side of the lower garnish 11 cannot be seen from the outside while opening the tailgate 3.

Figure 4:
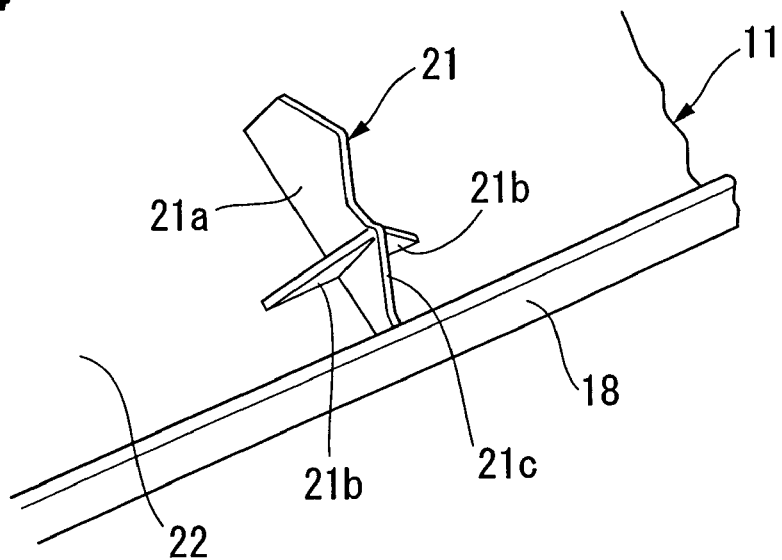
FIG. 4 shows the same embodiment and is a perspective view seen from an arrow-C in FIG. 3.

As shown in FIGS. 3 and 4, stopping ribs 21 are unitarily formed on a bottom edge of the lower garnish 11 50 as to protrude toward the outer panel 17. These stopping ribs 21 are unitarily formed on plural locations so as to be separated from each other in the car width direction. These stopping ribs 21 each make contact with the cabin exterior side (a rear face in the car length direction) of the turned hemming flange 16a of the inner panel 16. In more detail, the stopping ribs 21 are each provided with: a rib main body 21a extending so as to be substantially orthogonal to the bending piece 18 and to a vertical wall 22 of the lower garnish 11 which covers the rear side in the vehicle direction of the outer panel 17; and supporting ribs 21b provided on both sides of the rib main body 21a so as to extend in the direction substantially orthogonal to the rear main body 21a. An inclined supporting face 21c is formed on the rib main body 21a so as to contact a rear face of the inclined hemming flange 16a. The supporting ribs 21b are formed at a location near the upper end of the inclined supporting face 21c. The rib main body 21a is unitarily joined with the vertical wall 22 and the bending piece 18 of the lower garnish 11 to reinforce the rigidity of the bending piece 18.

Next, a manufacturing method for the door frame panel 4 will be explained below.

Figure 5:
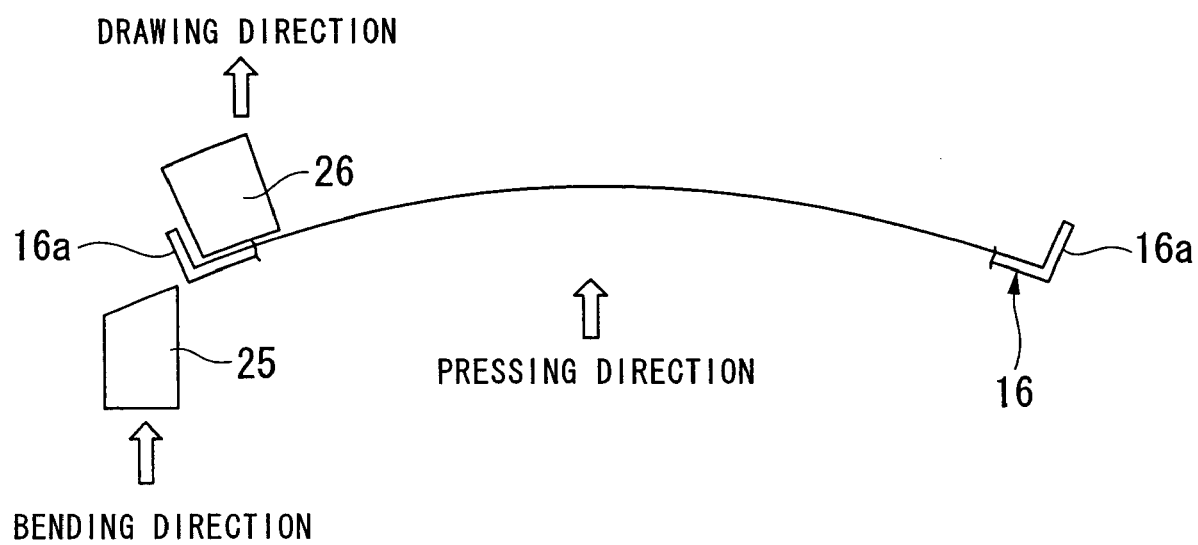
FIG. 5 shows the same embodiment and is a schematic diagram showing a manufacturing process of an inner panel.

The inner panel 16 and the outer panel 17 are punched into a predetermined shape in advance, and are thereafter formed by press-working into a predetermined shape such that the cabin interior side thereof forms a concaved-shape. At this time, as shown in FIG. 5, a bending to form a concaved-shape of the main portion and a preliminary bending of the hemming flanges 16a of the periphery of the inner panel 16 are applied to the inner panel 16 by metal molds 25 and 26. This preliminary bending is performed by bending the hemming flanges 16a to substantially right angles (90° to 100°) toward the direction opposite to the curving direction of the inner panel 16. Accordingly, as shown in FIG. 5, the hemming flanges 16a after the preliminary bending open towards the outside with respect to the joining direction of the outer panel 17 (an upper direction in FIG. 5).

In this press-working, since the hemming flanges 16a are bent in an opposite direction to the curving direction of the concaved-shape of the inner panel 16, the hemming flanges 16a do not form an undercut-shape with respect to a main body of the inner panel 16. Therefore, the metal mold 25 for bending and the metal mold 20 for receiving have the same operating directions as of a main pressing. Accordingly, a press-working device employed herein does not need to change the working directions of the metal molds 25 and 26 using a cam mechanism; therefore, a construction thereof can be simpler.

Figure 6:
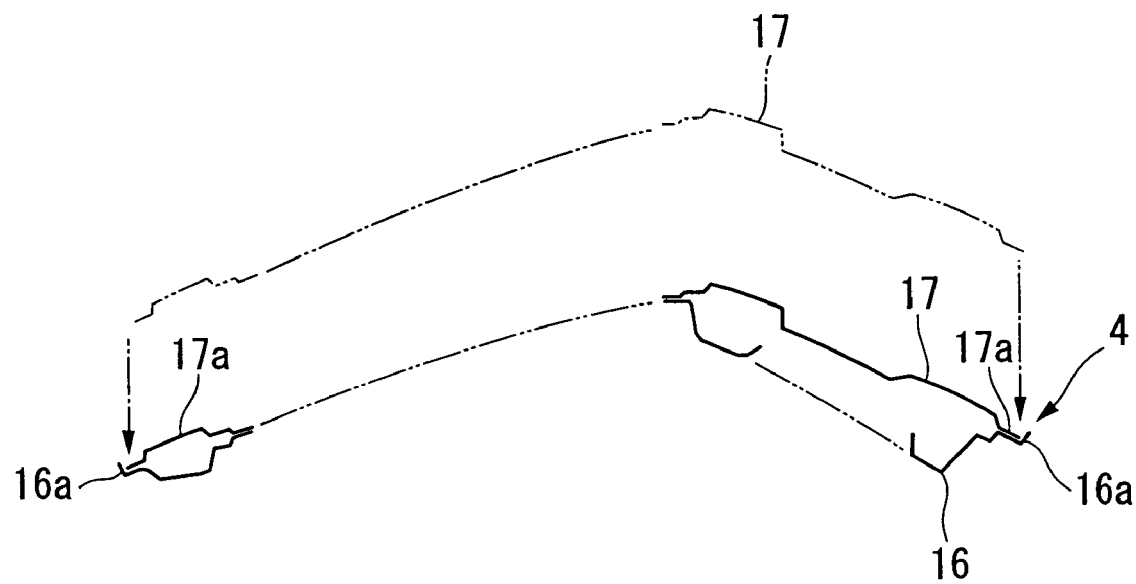
FIG. 6 shows the same embodiment and is a schematic diagram showing a manufacturing process of a door.
Figure 7:
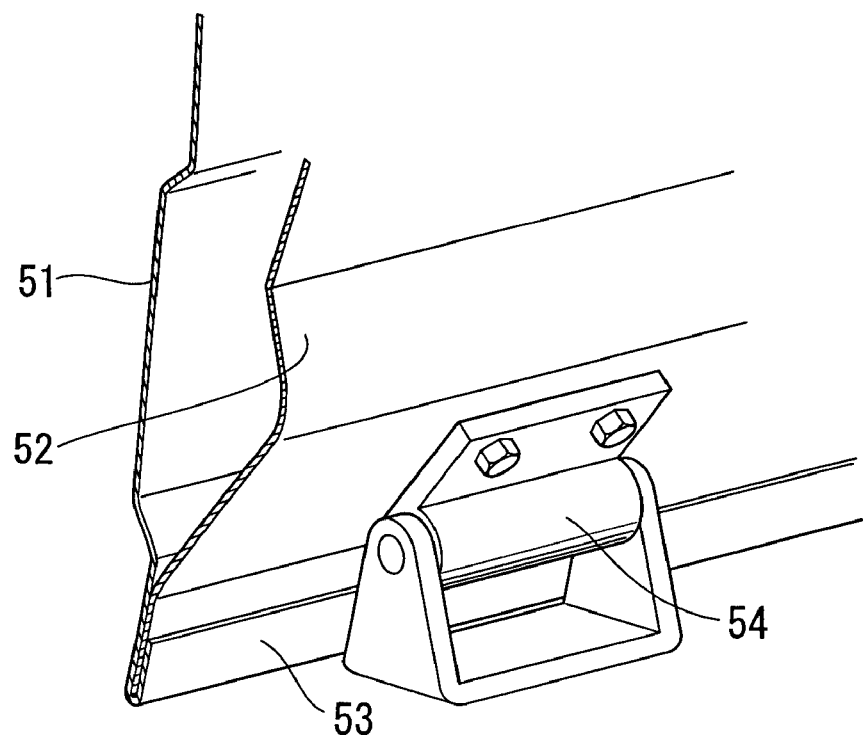
FIG. 7 shows a prior art and is a partial perspective cross-sectional view of a door.
Figure 8:
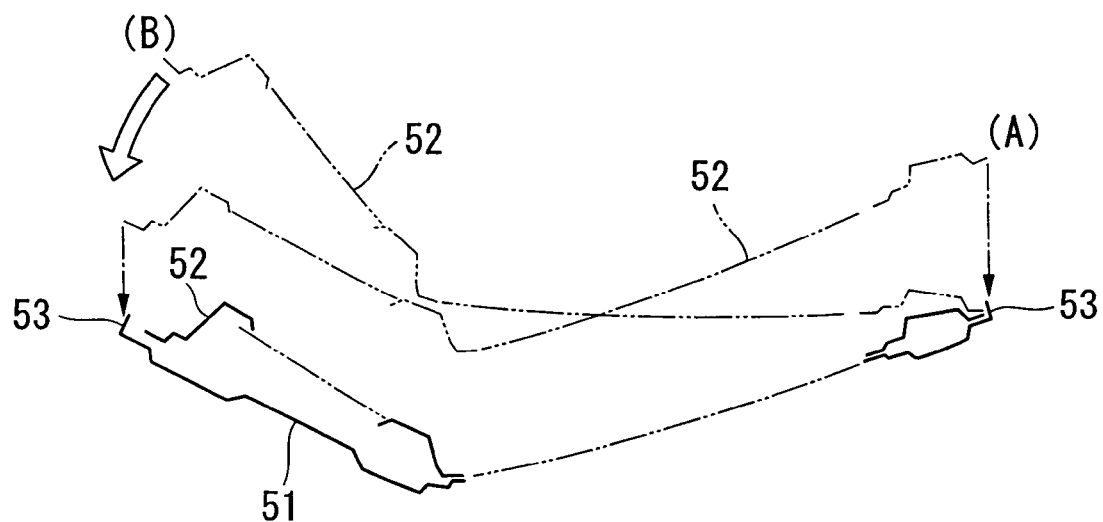
FIG. 8 is a schematic diagram showing a conventional manufacturing process of a door.
Figure 9:
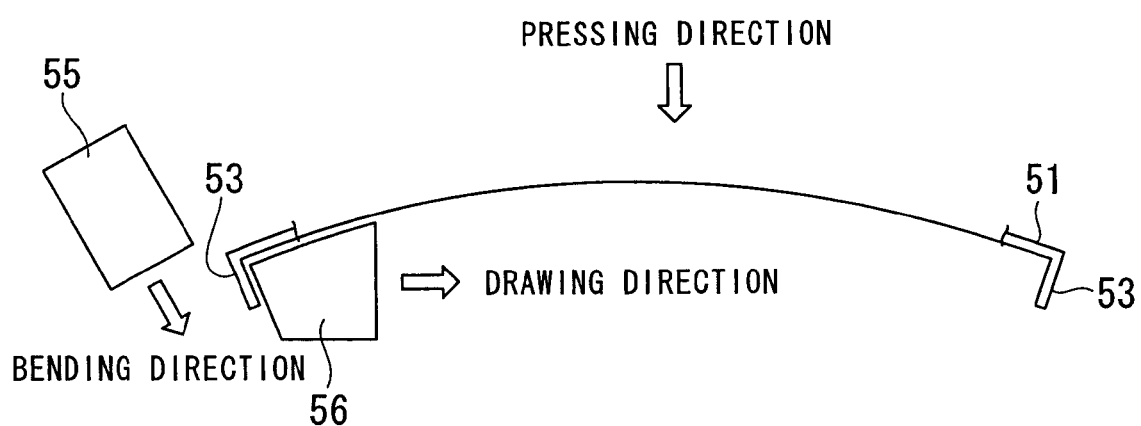
FIG. 9 is a schematic diagram showing a conventional manufacturing process of an outer panel.

Thereafter, as shown in FIG. 6, the outer panel 17 in which the press-working is completed is set onto the cabin exterior side surface of the inner panel 16 in which the same kind of press-working such as the preliminary bending and the like is completed. At this time, the hemming flanges 16a of the inner panel 16 open towards the outside with respect to the setting direction of the outer panel 17; and furthermore, the opening width between the hemming flanges 16a on both sides becomes wider than the width of the outer panel 17. Accordingly, the outer panel 17 can be easily set onto a predetermined position on the inner panel 16. Upon a setting the outer panel 17 onto bottoms of the bending portions of the hemming flanges 16a, the outer panel 17 is positioned with respect to the inner panel 16.

Subsequently, from this setting state, hemming is performed on the preliminarily bended hemming flanges 16a, and the distal ends of the hemming flanges 16a are turned onto the cabin exterior side face of the joining flange 17a of the outer panel 17. Upon turning of the hemming flanges 16a onto the joining flange 17a, the inner panel 16 and the outer panel 17 are unitarily joined with each other.

In the case in which the door frame panel 4 is manufactured as mentioned in the above, it is possible to simplify a construction of the manufacturing apparatus, and to easily set the outer panel 17 with respect to the inner panel 16 before performing the hemming. Accordingly, the production performance can be improved reliably.

In addition, in this tailgate 3, the turning ends formed by the hemming between the inner panel 16 and the outer panel 17 are positioned so as to be on the cabin exterior side of the outer panel 17. Therefore, the hemming flanges 16a will not be seen from the outside while lifting up the tailgate 4. Accordingly, an appearance quality of the vehicle can be improved. Furthermore, in the present embodiment, on the middle lower side of the tailgate 3, the cabin exterior sides of the hemming flanges 16a are completely covered with the resin-made lower garnish 11; therefore, the hemming flanges 16a cannot be seen from the cabin exterior side.

In this tailgate 3, after manufacturing the door frame panel 4 as explained above, the door frame panel 4 is attached into the door opening 2 via the door hinges 20. Thereafter, a dust-sealer 30 is pasted onto the end portions of the hemming flanges 16a. If the hemming flanges 16a joining the inner panel 16 and the outer panel 17 were located on the cabin interior side, it would be difficult to paint the dust-sealer 30 onto the end portions of the hemming flanges 16a due to the existence of obstacles, such as the door hinges 20. However, in the present embodiment, since the hemming flanges 16a are located on the cabin exterior side of the outer panel 17, the door hinges 20 will not be an obstacle at all for painting the dust-sealer 30. Accordingly, while in a state in which the tailgate 3 is completely closed, the dust-sealer 30 can be painted easily onto the end portions of the hemming flanges 16a.

In addition, according to the tailgate 3 of the present embodiment, the stopping ribs 21 are unitarily formed on the bottom leading edge of the lower garnish 11 so as to protrude toward the outer panel 16 side, and thereby make contact with the hemming flanges 16a; therefore, the rigidity of the lower leading edge of the lower garnish 11 can be increased by the stopping ribs 21, and thereby prevent a deformation of the lower leading edge of the lower garnish 11 when the tailgate 3 is strongly closed. Accordingly, the appearance quality of the vehicle will increase. Furthermore, according to the present embodiment, since the stopping ribs 21 are unitarily formed on the lower garnish 11, there is an advantage in that the number of parts can be decreased.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, the door of the present embodiment is a tailgate provided on the rear of the vehicle; however, the door according to the present embodiment may be doors other than the tailgate.

What is claimed is:

1. A door construction for a vehicle provided with a door main body including an inner panel on a cabin interior side and an outer panel on a cabin exterior side, wherein
    the inner panel and the outer panel are formed in a concaved-shape when viewed from the cabin interior side;
    a hemming flange is provided on a periphery of the inner panel, which is to be turned onto the outer panel;
    the inner panel and the outer panel are joined with each other by joining the hemming flange onto the cabin exterior side of the outer panel by a hemming;
    a resin-made exterior panel for covering the hemming flange from an outside thereof is provided on the cabin exterior side of the outer panel;
    the exterior panel includes a stopping rib which is unitarily formed therein so as to protrude toward the outer panel; and
    the stopping rib contacts with the hemming flange.

2. The door construction for a vehicle according to claim 1, wherein
    a covering portion which covers the hemming flange from the cabin exterior side is provided in a transparent member.

3. The door construction for a vehicle according to claim 1, wherein
    the door main body is a tailgate; and
    the hemming flange is covered with a resin-made exterior panel at a substantially middle lower of the tailgate, and a covering portion of a transparent member at a substantially middle upper of the tailgate.

4. The door construction for a vehicle according to claim 1, wherein
    a filler is painted on an end of the hemming flange.

5. A door construction for a vehicle provided with a door main body including an inner panel on a cabin interior side and an outer panel on a cabin exterior side, wherein
    the inner panel defines a hemming flange that is provided along an entire periphery of the inner panel;
    the inner panel and the outer panel are joined with each other by joining the hemming flange onto the cabin exterior side of the outer panel by a hemming, such that the entire periphery of the inner panel is joined to the cabin exterior side of the outer panel;
    a resin-made exterior panel for covering the entire hemming flange from an outside thereof is provided on the cabin exterior side of the outer panel;
    the exterior panel includes a stopping rib which is unitarily formed therein so as to protrude toward the outer panel; and
    the stopping rib contacts with the hemming flange.

6. The door construction for a vehicle according to claim 5, wherein
    a covering portion which covers the hemming flange from the cabin exterior side is provided in a transparent member.

7. The door construction for a vehicle according to claim 5, wherein
    the door main body is a tailgate; and
    the hemming flange is covered with the resin-made exterior panel at a substantially middle lower of the tailgate, and a covering portion of a transparent member at a substantially middle upper of the tailgate.

8. The door construction for a vehicle according to claim 5, wherein
    a filler is painted on an end of the hemming flange.

* * * * *